United States Patent
Frauenhofer et al.

(10) Patent No.: US 9,257,877 B2
(45) Date of Patent: Feb. 9, 2016

(54) SUPERCONDUCTING MACHINE AND METHOD FOR THE OPERATION THEREOF

(75) Inventors: Joachim Frauenhofer, Nürnberg (DE); Jörn Grundmann, Groβenseebach (DE); Rainer Hartig, Buxtehude (DE); Peter Kummeth, Herzogenaurach (DE); Peter Van Hasselt, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 23 days.

(21) Appl. No.: 14/241,919

(22) PCT Filed: Aug. 17, 2012

(86) PCT No.: PCT/EP2012/066083
§ 371 (c)(1),
(2), (4) Date: Apr. 17, 2014

(87) PCT Pub. No.: WO2013/034419
PCT Pub. Date: Mar. 14, 2013

(65) Prior Publication Data
US 2014/0247022 A1    Sep. 4, 2014

(30) Foreign Application Priority Data
Sep. 8, 2011   (DE) .......................... 10 2011 082 365

(51) Int. Cl.
*H02P 9/00*   (2006.01)
*H02K 3/28*   (2006.01)
(Continued)

(52) U.S. Cl.
CPC .. *H02K 3/28* (2013.01); *H02K 9/24* (2013.01); *H02K 55/04* (2013.01); *H02P 9/02* (2013.01);
(Continued)

(58) Field of Classification Search
USPC ............................................... 322/90; 310/52
See application file for complete search history.

(56) References Cited

U.S. PATENT DOCUMENTS 3,743,574 A   7/1973   Smith, Jr. et al.
3,743,875 A   7/1973   Smith, Jr. et al.
(Continued)

FOREIGN PATENT DOCUMENTS

CN   86108225 A   6/1988
CN   1405957 A   3/2003
(Continued)

OTHER PUBLICATIONS

International Preliminary Report on Patentability dated Jun. 28, 2014.
(Continued)

*Primary Examiner* — Pedro J Cuevas
(74) *Attorney, Agent, or Firm* — Harness, Dickey & Pierce, P.L.C.

(57) ABSTRACT

A superconducting machine is disclosed, in particular for use as a generator in a stand-alone power system. In at least one embodiment, the superconducting machine includes a stator and a rotor capable of rotating with respect to the stator. At least one superconducting coil for generating at least two magnetic poles is provided on at least one component part, in particular the rotor, which superconducting coil is cooled via a cooling device; and at least two parallel winding elements are provided on the respective other component part, in particular the stator, in the armature winding for each phase, which winding elements can be connected either in series or in parallel via at least one switching device.

18 Claims, 3 Drawing Sheets

(51) Int. Cl.
  H02K 55/04 (2006.01)
  H02K 9/24 (2006.01)
  H02P 9/02 (2006.01)
  H02P 9/14 (2006.01)
  H02K 9/00 (2006.01)

(52) U.S. Cl.
  CPC .............. *H02P 9/14* (2013.01); *H02K 2213/06* (2013.01); *H02K 2213/09* (2013.01); *H02P 9/006* (2013.01); *Y02E 40/625* (2013.01)

(56) References Cited

U.S. PATENT DOCUMENTS

| | | | | |
|---|---|---|---|---|
| 3,904,901 | A * | 9/1975 | Renard et al. | 310/52 |
| 4,126,798 | A * | 11/1978 | Carr et al. | 310/204 |
| 4,200,817 | A | 4/1980 | Bratoljic | |
| 4,328,427 | A | 5/1982 | Bond | |
| 4,464,617 | A | 8/1984 | Yantovsky et al. | |
| 4,689,546 | A | 8/1987 | Stephens et al. | |
| 5,677,586 | A * | 10/1997 | Horst | 310/103 |
| 5,994,860 | A * | 11/1999 | Krueger et al. | 318/527 |
| 6,420,842 | B1 * | 7/2002 | Gold | 318/141 |
| 6,791,216 | B2 * | 9/2004 | Kalsi | 310/52 |
| 6,828,919 | B1 * | 12/2004 | Gold | 340/870.29 |
| 7,207,178 | B2 * | 4/2007 | Steinmeyer | 62/6 |
| 7,429,840 | B2 * | 9/2008 | Pollock et al. | 318/254.1 |
| 7,453,174 | B1 | 11/2008 | Kalsi | |
| 7,528,510 | B2 * | 5/2009 | Frank et al. | 310/52 |
| 7,843,094 | B2 * | 11/2010 | Goodzeit et al. | 310/52 |
| 7,956,503 | B2 * | 6/2011 | Goodzeit et al. | 310/112 |
| 8,084,909 | B2 * | 12/2011 | Goodzeit et al. | 310/112 |
| 9,065,306 | B2 | 6/2015 | Shinzato | H01F 6/06 |
| 2002/0053889 | A1 * | 5/2002 | Gold | 318/154 |
| 2002/0171312 | A1 * | 11/2002 | Wang et al. | 310/208 |
| 2003/0030344 | A1 | 2/2003 | Hatz et al. | |
| 2003/0034701 | A1 | 2/2003 | Weeber et al. | |
| 2004/0056541 | A1 * | 3/2004 | Steinmeyer | 310/52 |
| 2004/0155538 | A1 * | 8/2004 | Kalsi | 310/52 |
| 2006/0119193 | A1 * | 6/2006 | Laskaris et al. | 310/52 |
| 2006/0197396 | A1 * | 9/2006 | Pollock et al. | 310/166 |
| 2007/0095075 | A1 * | 5/2007 | Frank | 62/48.2 |
| 2010/0066299 | A1 | 3/2010 | Izumi | |
| 2010/0259117 | A1 * | 10/2010 | Goodzeit et al. | 310/52 |
| 2015/0194248 | A1 * | 7/2015 | Holcomb | H01F 6/006 505/163 |
| 2015/0206635 | A1 * | 7/2015 | Murase | H01F 6/02 505/166 |
| 2015/0270769 | A1 * | 9/2015 | Sato | H02K 55/04 505/163 |

FOREIGN PATENT DOCUMENTS

| | | |
|---|---|---|
| CN | 1787336 A | 6/2006 |
| DE | 19931010 | 11/2000 |
| DE | 10047287 A1 | 4/2002 |
| EP | 0 228 012 | 7/1987 |
| JP | 2004064807 A | 2/2004 |
| JP | 2008-237020 A | 10/2008 |

OTHER PUBLICATIONS

International Search Report and Written Opinion dated May 8, 2014.
1 International Preliminary Preliminary Report on Patentability dated Mar. 6, 2014.
Australian Report on Examination dated Nov. 17, 2014.
Australian Patent Examination Report No. 2 dated Apr. 24, 2015.
Office Action for Korean Patent Application No. 10-2014-7008932 dated Jun. 12, 2015 with English language translation.
International Preliminary Preliminary Report on Patentability dated Mar. 6, 2014.
Office Action for Chinese Patent Application No. 201280043955.4 dated Sep. 22, 2015 with English language translation.

* cited by examiner

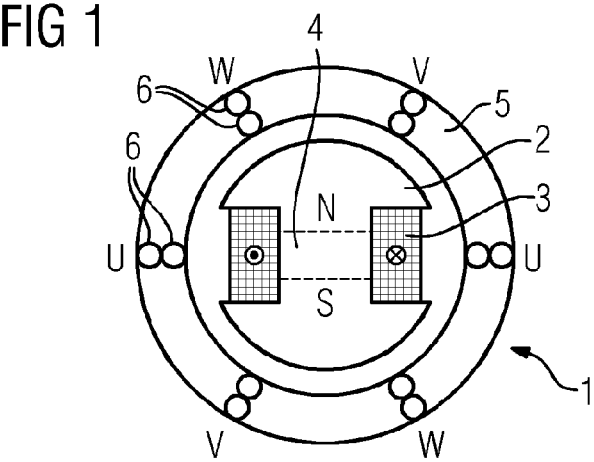
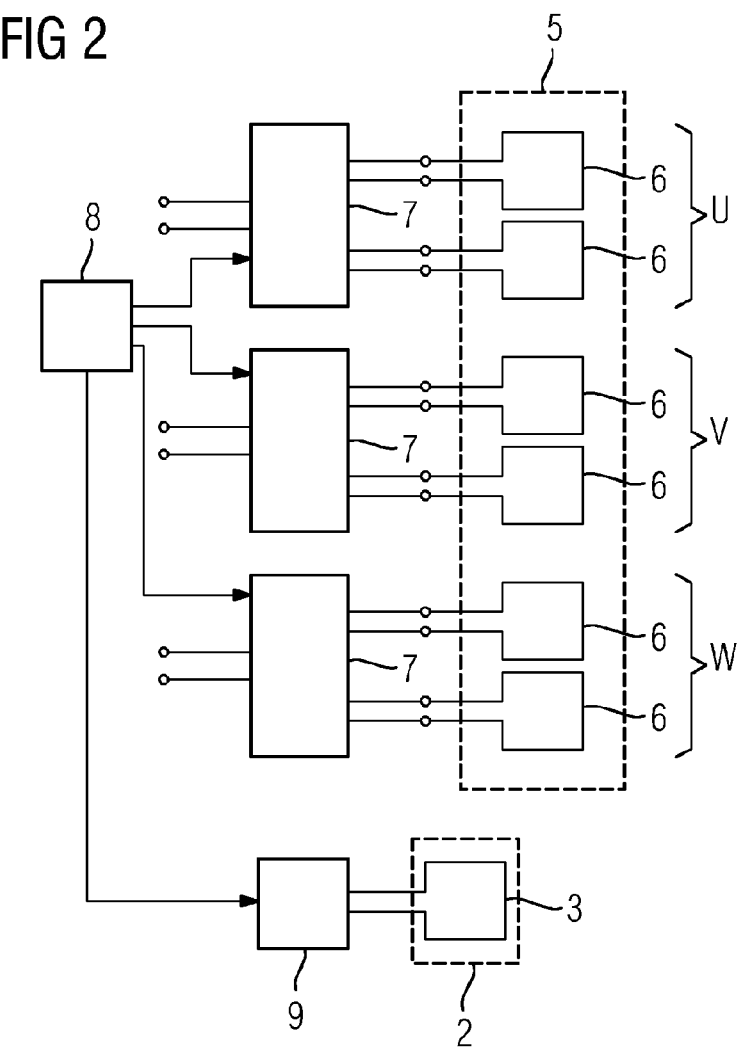

SUPERCONDUCTING MACHINE AND METHOD FOR THE OPERATION THEREOF

PRIORITY STATEMENT

This application is the national phase under 35 U.S.C. §371 of PCT International Application. No. PCT/EP2012/066083 which has an International filing date of Aug. 17, 2012, which designated the United States of America, and which claims priority to German Patent Application number 10 2011 082 365.4 filed Sep. 8, 2011, the entire contents of each of which are hereby incorporated herein by reference.

FIELD

At least one embodiment of the invention generally relates to a superconducting machine. In particular, at least one embodiment relates to a superconducting machine for use as a generator in a stand-alone power system, comprising as components a stator and a rotor capable of rotating with respect to the stator,
wherein at least one superconducting coil for generating at least two magnetic poles is provided on at least one component, in particular the rotor, which superconducting coil is cooled via a cooling device. The invention also relates to a method for operating such a superconducting machine.

BACKGROUND

Superconducting machines comprising superconducting coils, residing in particular of a high-temperature superconductor material, as excitation windings for generating the magnetic fields in the poles are already known from the prior art. In electric machines of this kind, the superconducting coil must be actively cooled via a cooling device, in particular having at least one cold head. If the temperature of the superconducting coil rises above its operating temperature, the rated excitation current for operating the superconducting machine can no longer be achieved.

When operated in generator mode, such superconducting machines, particularly high-temperature superconductor synchronous machines, are also used as energy sources in a stand-alone power system, e.g. on a ship. Here the problem arises as to how, after a malfunction, e.g. a cooling failure, operation of the power system can basically be maintained to a limited extent or restored, as, particularly after a failure of the cooling of the superconducting coil, heating of the excitation winding occurs, with the result that operation at rated current is no longer possible.

To solve this problem, it has been proposed to provide an emergency power supply, e.g. an additional diesel set, which, prior to the actual desired operation being restored, also provides power over a comparatively long period for auxiliary equipment for cooling the superconducting coil as an excitation winding. Here, however, an additional generator device is required, which is expensive and makes superconducting machines, particularly high-temperature superconductor synchronous machines, a less attractive proposition for generating energy in a stand-alone power system.

SUMMARY

At least one embodiment of the invention specifies an improved way of increasing operating reliability and handling malfunctions for superconducting machines used as generators, e.g. in a stand-alone power system.

At least one embodiment is directed to a superconducting machine by providing that
on the respective other component, in particular the stator, at least two parallel-running winding elements are provided in the armature winding for each phase, which winding elements can be connected either in series or in parallel via at least one switching device.

For better illustration, it will frequently be assumed in the following that, in accordance with normal design, the excitation winding with the superconducting coil is accommodated in the rotor (internal field machine). This means that the stator is in this case the armature having the armature winding. However, at least one embodiment of the present invention is also applicable to the reverse design in which the poles having the superconducting coils, i.e. the excitation winding, are accommodated in the stator and thus the armature winding (located in die rotor) is considered in respect of the different circuitry rotating armature machine). The rotor can also be implemented as an internal rotor or as an external rotor, possibly even as a hybrid form. In addition, the conventional terminology is used, wherein a phase winding describes one or more winding elements of a winding which are assigned to a particular phase; a winding element is part of a winding whose turns or coils are permanently interconnected. Moreover, the term armature winding denotes the winding which, during operation, draws active power and/or reactive power from the external electrical system or supplies active power and/or reactive power thereto.

According to at least one embodiment of the invention it is therefore proposed to implement the armature windings in which the energy for the stand-alone power system is generated, i.e. in particular the stator windings, in multiple parallel manner in a plurality of winding elements, wherein they can be connected either in parallel or in series via at least one switching device, i.e. in particular a switching device. This is carried out in the same way for each phase, wherein a three-phase overall winding is normally used. If the winding elements are connected in series, for the same excitation current the power is generated with a higher voltage and lower current than if the winding elements are connected in parallel. In order to minimize circuit complexity, it can be advantageously provided that an even number, in particular two in each case, of parallel winding elements is provided for each phase.

Using the method according to at least one embodiment of the invention, it is therefore also possible to make a superconducting machine operated in generator mode in a stand-alone power system more fail-safe by being able to implement the emergency operating mode also at higher operating temperatures and to continue operating the superconducting machine at reduced power.

BRIEF DESCRIPTION OF THE DRAWINGS

Further advantages and details of the present invention will emerge from the exemplary embodiments described below and with reference to the accompanying drawings in which:

FIG. 1 shows a schematic diagram of a machine according to an embodiment of the invention, FIG. 2 shows the connection of the winding elements in a schematic diagram, FIG. 3 symbolically illustrates a connection in normal operating mode, and FIG. 4 symbolically illustrates a connection in emergency operating mode.

DETAILED DESCRIPTION OF THE EXAMPLE EMBODIMENTS

Figure 3:
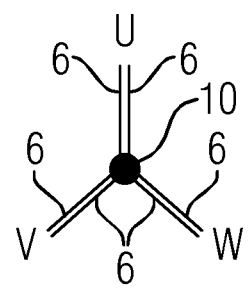

According to at least one embodiment of the invention it is therefore proposed to implement the armature windings in which the energy for the stand-alone power system is generated, i.e. in particular the stator windings, in multiple parallel manner in a plurality of winding elements, wherein they can be connected either in parallel or in series via at least one switching device, i.e. in particular a switching device. This is carried out in the same way for each phase, wherein a three-phase overall winding is normally used. If the winding elements are connected in series, for the same excitation current the power is generated with a higher voltage and lower current than if the winding elements are connected in parallel. In order to minimize circuit complexity, it can be advantageously provided that an even number, in particular two in each case, of parallel winding elements is provided for each phase.

In this example, at the rated excitation current, a series connection of the winding elements would permit twice the generated voltage. It is therefore possible, depending on the soft iron content in the region of the superconducting coil, i.e. of the excitation winding, to generate the normal rated voltage even in the case of an excitation current that is approximately half the rated excitation current. However, only half the rated power of the machine can be generated here, as only half the current can flow in the series-connected winding sub-elements. At least one embodiment of the invention therefore makes it possible to reduce the excitation current while nevertheless enabling the stand-alone power system to continue to be supplied with energy. A lower excitation current can in particular be implemented even at significantly higher temperatures.

Altogether this means that, when using n parallel winding elements per phase in the armature winding, i.e. in particular in the stator, in the case of a series connection the full rated voltage can be produced at approximately an nth of the rated excitation with a power that is an nth of the rated power, the current in the winding elements likewise being only an nth of the rated current.

Such a voltage-switchable winding having the parallel-running winding elements can be implemented with relatively little cost/complexity, as parallel winding elements are frequently used anyway to implement the power-generating windings. What is required is the switching device(s) which in a simple case can be implemented by terminals in a terminal box of the superconducting machine. The terminal connections can then be changed over manually. Preferably, however, the at least one switching device are implemented by in particular controllable switches, e.g. relays.

The advantage of at least one embodiment of the present invention is that in this way the machine can achieve the full rated voltage even at a reduced excitation current, wherein such a reduced excitation current can be permitted at significantly higher temperatures of the superconducting coil. This means, therefore, even in the event of cooling device failure, for example, that the superconducting machine can continue to be operated in an emergency operating mode at reduced excitation current for a comparatively long period of time and provide the rated voltage as the system voltage for the stand-alone power system, wherein, in the case of two series-connected winding elements in emergency operating mode, for example, half the rated power is still available which ideally can not only supply the auxiliary equipment for the superconducting machine but also large parts of the stand-alone power system. The circuit complexity involved here is low.

In a development of at least one embodiment of the present invention, it can be particularly advantageously provided that the superconducting machine has a control device implementing two operating modes, which device is designed to set the switching device(s) to parallel connection of the winding elements for a normal operating mode and to set the switching means to series connection of the winding elements and set an excitation device for the superconducting coil to reduce the excitation current for an emergency operating mode, particularly in the event of cooling device failure.

A normal operating mode and an emergency operating mode are therefore provided by the control device, wherein in normal operating mode the normal rated power is provided at the rated voltage, but in emergency operating mode a reduced power is possible, as the control device is expediently also designed to reduce the excitation current for the superconducting coil. The reduction of the excitation current from the rated excitation current, which can take place by controlling a corresponding excitation device, is performed such that the rated voltage (at correspondingly reduced power as stated) is maintained, i.e. the stand-alone power system can continue to be operated via the superconducting machine. In particular, it can be provided that, in an emergency operating mode, the control device is designed to reduce the excitation current for the superconducting coil to a proportion of the rated excitation current corresponding to the number of winding elements to be switched over. If, in an advantageous embodiment, two winding elements are present for each phase, the excitation current can be halved so that the same rated voltage is achieved and the power output is halved.

The control device can also be designed to activate the emergency operating mode in the event of cooling device failure and/or the power of an excitation device being too low for the superconducting coil and/or other fault scenarios. Such malfunctions can also be detected by suitable detection means, e.g. sensors such as temperature, voltage and current measuring devices. Switchover to emergency mode can then take place automatically even in the event of a fault, which mode then enables the superconducting machine to continue operating as a generator, albeit in a limited manner, even at higher temperatures in the stand-alone power system.

With at least one embodiment of the present invention, it is basically also conceivable that, in the case of an even number of more than two winding elements for each phase, the switching device(s) is also designed to connect some of the winding elements in parallel and some of the winding elements in series so that the same parallel connections are always connected in series and the same series connections are always connected in parallel. It is therefore quite conceivable for different switching states to be implemented in which only some of the winding elements are connected in series, while others are connected in parallel, wherein care must be taken to ensure that each subsidiary switching unit has the correct voltage. Reduced excitation currents can then be determined accordingly such that the rated voltage nevertheless continues to be achieved. Thus, for example, a plurality of emergency operating modes are conceivable in which different reduced powers are available at the rated voltage.

The superconducting machine can be implemented as a synchronous machine and/or the superconducting windings can be made of a high-temperature superconductor material.

High-temperature superconductor synchronous machines are particularly suitable for operation as a generator in a stand-alone power system.

It can also be provided that phase windings of the different phases are connected in star or delta. Both possibilities are established practice and also conceivable for at least one embodiment of the present invention.

In addition to the superconducting machine, at least one embodiment of the present invention also relates to a method for operating an inventive superconducting machine, wherein, in a normal operating mode, the winding elements are connected in parallel to produce a rated power and, in an emergency operating mode, in particular in the event of cooling device failure, the winding elements are connected in series to produce a lower power than the rated power. All the comments relating to be superconducting machine apply equally to the inventive method which implements the normal operating mode and the emergency operating mode and therefore the advantages of at least one embodiment of the present invention.

It is provided in particular that, in the emergency operating mode, the superconducting coil is operated with a lower excitation current than the rated current, in particular such that the rated voltage of the superconducting machine is also produced in the emergency operating mode. Therefore, if two winding elements are used for each phase, for example, the excitation current can be e.g. halved in order produce the rated voltage. It can also be provided that the emergency operating mode is activated in the event of failure or malfunction of the cooling device and/or if the power of an excitation device for the superconducting coil is too low. This can otherwise also take place via a control device via which the entire method according to at least one embodiment of the invention can also be implemented in an automated manner.

Using the method according to at least one embodiment of the invention, it is therefore also possible to make a superconducting machine operated in generator mode in a stand-alone power system more fail-safe by being able to implement the emergency operating mode also at higher operating temperatures and to continue operating the superconducting machine at reduced power.

FIG. 1 shows a greatly simplified schematic diagram of an inventive superconducting machine 1 which is implemented here as a synchronous machine. It comprises a rotor 2 which, for simpler representation, is shown here as bipolar. To produce the magnetic flux at the poles, the rotor incorporates a superconducting coil 3 as an excitation winding, the conductors of which consist of a superconductor material, in particular a high-temperature superconductor material. The cooling device for the superconducting coil 3 is only partially indicated at 4. The implementation of such cooling devices is largely known from the prior art and does not need to be explained in greater detail here.

The rotor 2 implemented as an internal rotor is rotatably mounted with respect to a stator 5 which has a plurality of stator windings U, V, W (armature windings) represented in a simplified manner, each of which is assigned to one of three phases. The stator winding U, V, W each have two parallel-running winding elements 6. The specific routing of the windings, the number of stator teeth and the like can be implemented in many different ways known in principle from the prior art and do not require further explanation here.

In another schematic diagram, FIG. 2 shows in greater detail the specific interconnection of the stator windings U, V, W, specifically of the winding elements 6. As can be seen, a controllable switching means 7 via which the winding elements 6 can be connected either in parallel or in series is provided in each case for the winding elements 6 of each phase. Possibilities for designing such switching means are largely known from the prior art and will not therefore be explained in greater detail.

The machine 1 also comprises a control device 8, which is designed to control the switching means 7, and an excitation device 9 for producing an excitation current for the superconducting coil 3.

If the control device 8 now receives the information that a malfunction is present, which can take place via corresponding detection, device(s) not shown in greater detail here and/or a manual input, i.e. if the cooling device 4 has failed and/or the excitation device 9 can no longer be operated at full power, for example, the control device 8 switches over from a normal operating mode, in which the switching means 7 are connected such that the winding elements 6 are connected in parallel and the excitation device 9 provides the rated excitation current, to an emergency operating mode in which the switching devices 7 are connected such that the winding elements 6 are connected in series, and the excitation device 9, depending on the soft iron content, provides only approximately half the rated excitation current as excitation current for the superconducting coil 3.

Figure 4:
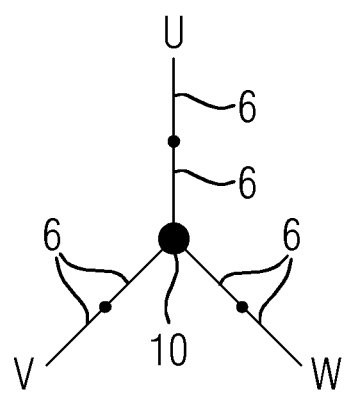
Figure 5:
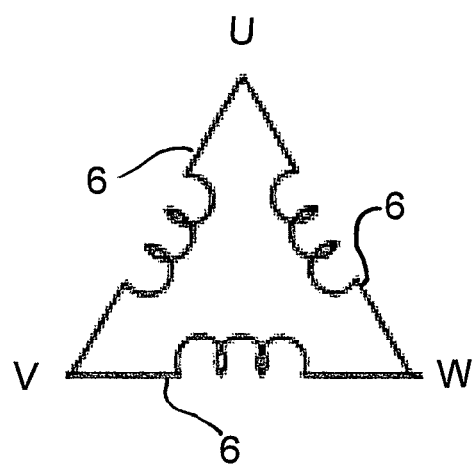
FIG. 5 shows a delta connection of phase windings.

These two operating states are represented schematically in greater detail by FIGS. 3 and 4. FIG. 3 shows the normal operating mode in which the winding elements 6 are connected in parallel, hence are connected to the star point 10 in parallel. FIG. 4 shows the emergency operating mode in which the winding elements 6 are connected in series and consequently connected to the star point 10 as a long overall winding. FIG. 5 shows an example of a delta winding.

Since half the rated excitation current implementable even at higher temperatures than the usual operating temperature of the superconducting coil 3 is used in the emergency operating mode, the series connection of the winding elements 6 results in the same rated voltage, but at half the maximum power, as the maximum current produced in the subsidiary winding elements 6 is only half as large.

If the superconducting machine 1 is therefore used as a generator on a stand-alone power system, the superconducting machine 1 can achieve the full rated voltage even at approximately half the excitation current. This reduced excitation current can be permitted at significantly higher temperatures of the superconducting coil 3, hence also in the event of cooling device failure 4. At half power, a very high power is nevertheless still available which can be used for emergency operation.

Although the invention has been illustrated and described in greater detail by the preferred exemplary embodiment, the invention is not limited by the examples disclosed and other variations can be deduced therefrom by the average person skilled in the art without departing from the scope of protection sought.

The invention claimed is:
1. A superconducting machine, comprising:
a stator; and
a rotor capable of rotating with respect to the stator, wherein on one of the stator and rotor, at least one superconducting coil for generating at least two magnetic poles is provided, said at least one superconducting coil being cooled by a cooling device, and wherein on the respective other of the stator and rotor, at least two parallel-running winding elements, connectable either in series and in parallel via at least one switching device, are provided in an armature winding for each phase.

2. The superconducting machine as claimed in claim 1, wherein an even number of parallel-running winding elements is provided for each phase.

3. The superconducting machine as claimed in claim 2, wherein two, in each case, parallel winding elements are provided for each phase.

4. The superconducting machine of claim 1, further comprising:
- a control device, configured to implement two operating modes, said control device being designed to set the at least one switching device to parallel connection of the winding elements for a normal operating mode, designed to set the at least one switching device to series connection of the winding elements and designed to set an excitation device for the superconducting coil to reduce an excitation current for an emergency operating mode.

5. The superconducting machine of claim 4, wherein the control device is designed to at least one of
- activate the emergency operating mode in at least one of an event of a cooling device failure and if the power of the excitation device for the superconducting coil is too low and
- reduce the excitation current for the superconducting coil to a proportion of the rated excitation current corresponding to the number of switched-over winding elements in the emergency operating mode.

6. The superconducting machine of claim 1, wherein the superconducting machine is implemented as a synchronous machine and wherein the conductor of the superconducting coil is made of a high-temperature superconductor material.

7. The superconducting machine of claim 1, wherein phase windings of different phases are connected in star or in delta.

8. The superconducting machine of claim 1, wherein the superconducting machine is for use as a generator in a stand-alone power system.

9. A stand-alone power system comprising a generator, wherein the generator includes the superconducting machine of claim 1.

10. The superconducting machine of claim 1, wherein on the rotor, at least one superconducting coil for generating at least two magnetic poles is provided and wherein, on the stator, at least two parallel-running winding elements, connectable either in series or in parallel via at least one switching device, are provided in an armature winding for each phase.

11. A stand-alone power system comprising a generator, wherein the generator includes the superconducting machine of claim 10.

12. A method for operating a superconducting machine including a stator and a rotor capable of rotating with respect to the stator, wherein on one of the stator and rotor, at least one superconducting coil for generating at least two magnetic poles is provided, said at least one superconducting coil being cooled by a cooling device, and wherein on the respective other of the stator and rotor, at least two parallel-running winding elements, connectable either in series or in parallel via at least one switching device, are provided in an armature winding for each phase, the method comprising:
- connecting, in a normal operating mode, the winding elements in parallel to produce a rated power; and
- connecting, in an emergency operating mode, the winding elements in series to produce a relatively lower power than the rated power.

13. The method of claim 12, wherein, in the emergency operating mode, the superconducting coil is operated at a relatively lower excitation current than the rated current.

14. The method of claim 13, wherein, in the emergency operating mode, the superconducting coil is operated such that the rated voltage of the superconducting machine is produced, even in the emergency operating mode.

15. The method of claim 14, wherein the emergency operating mode is activated at least one of
- in the event of failure or malfunction of the cooling device and
- if the power of an excitation device for the superconducting coil is too low.

16. The method of claim 13, wherein the emergency operating mode is activated at least one of
- in the event of failure or malfunction of the cooling device and
- if the power of an excitation device for the superconducting coil is too low.

17. The method of claim 12, wherein the emergency operating mode is activated at least one of
- in the event of failure or malfunction of the cooling device and
- if the power of an excitation device for the superconducting coil is too low.

18. The method of claim 12, wherein the superconducting machine is operated in generator mode in a stand-alone power system.

* * * * *